INVENTORS
RICHARD E. DEASY
ROBERT H. PARKER
RICHARD C. WHITE
BY
Moody and Kintzinger
ATTORNEYS INVENTORS
RICHARD E. DEASY
ROBERT H. PARKER
RICHARD C. WHITE
BY Moody and Kintzinger
ATTORNEYS United States Patent Office 3,310,745
Patented Mar. 21, 1967

3,310,745
FAST AGC VOLTAGE DECAY CIRCUIT FOR DATA SIGNAL HANDLING SIDEBAND RECEIVERS
Richard E. Deasy, Robert H. Parker, and Richard C. White, Cedar Rapids, Iowa, assignors to Collins Radio Company, Cedar Rapids, Iowa, a corporation of Iowa
Filed Nov. 13, 1963, Ser. No. 323,497
8 Claims. (Cl. 325—410)

Figure 1:
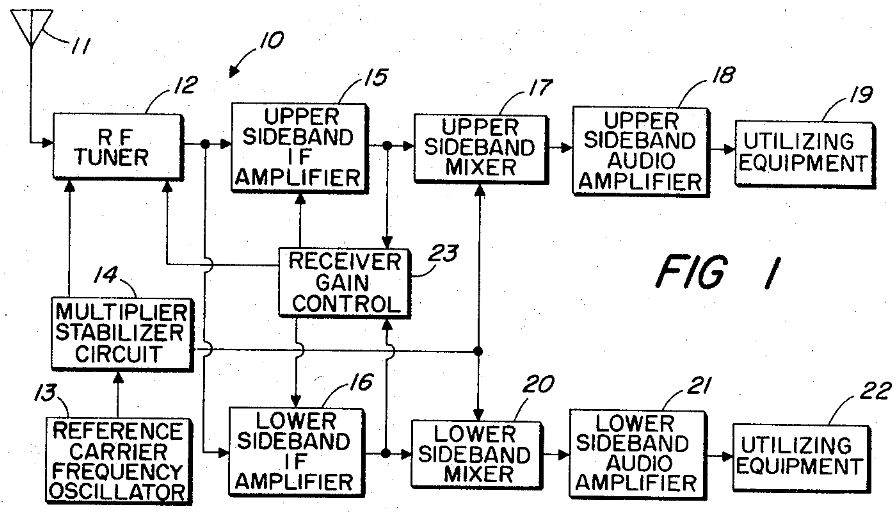

This invention relates in general to receiver automatic gain control, and in particular to AGC decay circuitry operable to quickly return a sideband receiver to maximum gain sensitivity immediately after a strong transmission signal being received has ceased so as to insure immediate subsequent reception of the sideband signal from a weaker station transmitting on the received frequency.

Sideband receivers employing automatic gain control (AGC) circuitry respond with varying speeds to conditions of instantaneous signal increase from weak signal levels to relatively strong signal levels. However, such conventional AGC circuits generally keep receiver gain so low while strong data signals are being received that a sudden drop in data signal level to a relatively weak signal level, with a relatively long receiver AGC decay period, results in considerable signal data loss during the initial reception of relatively weak data signals. This condition arises, for example, when various transmitters at different locations, or at different signal output levels, successively transmit data signals so that the received signal level varies through a considerable strength range by steps with the different transmissions being received by the receiver.

It is, therefore, a principal object of this invention to provide a fast AGC voltage control effectively returning the receiver to maximum gain sensitivity immediately after a strongly received transmission signal has ceased and to thereby insure complete reception without loss of data from a weakly received signal from a station transmitting at the same frequency immediately subsequent to the previously received strong signal.

A further object is to provide such fast AGC voltage decay capability with a receiver AGC system providing regular AGC response to signal attack to stronger signal levels and gain adjustment to normal received signal strength variations.

Another object is to provide such fast AGC voltage decay in a double sideband receiver with the sideband signal developing the greater AGC bias voltage supplying AGC bias to the RF tuner and to the IF amplifier staging of the sideband while the AGC bias voltage of the other sideband is supplied only to the IF amplifier staging of the other sideband.

Features of this invention useful in the accomplishment of the above objects include both upper and lower sideband AGC rectifier loops of a conventional nature, connected back to IF staging of the respective sidebands, and a connection from each loop through a gating diode to the receiver RF tuner AGC line. A fast AGC control system connected for receiving both upper and lower sideband IF signals is also connected to the RF tuner AGC line. Under normal operating conditions the AGC bias voltage, of greater magnitude, between the upper sideband and the lower sideband AGC loops, forwardly biases the diode between that loop and the RF tuner AGC line. This results in that AGC voltage bias being applied to the RF tuner, and simultaneous reverse biasing of the diode connection between the other sideband AGC loop and the RF tuner AGC line.

The fast AGC system comes into operation when there is a sudden drop in receiver input signal to a lower received signal on the same frequency, or to no signal at all, for quickly decreasing the otherwise existing AGC bias voltage in the RF tuner AGC line, and also in the sideband AGC loops with forward biasing of the diodes between the RF tuner AGC line and the respective sideband AGC loops. The fast AGC system includes a fast AGC rectifier section for developing control voltages applied to the base of a fast AGC control transistor. When the fast AGC control transistor is biased to conduction, it acts to reduce AGC bias voltage in the AGC RF tuner line and in the sideband AGC loops through the forwardly biased diodes between the RF tuner AGC line and the sideband AGC loops.

Within the fast AGC rectifier section, upper sideband and lower sideband IF input signal lines are each connected to a respective combination positive voltage and negative voltage rectifying and diode gating portion for developing, from the strongest lower or upper sideband input signal, a controlling positive voltage and balancing variable reference negative voltage. This combination of positive and negative voltages from the controlling stronger sideband IF input signal provides the condition for quickly developing a negative output bias at the base of the fast AGC control transistor when there is a sudden drop in received signal strength. This is provided when the received signal in a sideband, of the controlling sideband, drops quickly to a lower signal level, provided, at the same time, that there is no signal input to the other sideband, or the signal received in the other sideband is at a relatively weak level, or if both sideband signal levels simultaneously drop to a lower signal level, or to no signal input at all. A receiver with this system is generally able to recognize the difference between the excursion from high peaks to low valleys in a signal and the end of transmission, and if, in reality, transmission has ceased, to then bring the receiver to maximum gain sensitivity quickly (for example, 15 milliseconds) so as to not lose a portion of a signal that may be transmitted by a weaker station immediately, or shortly, following the end of transmission of a strong station.

A specific embodiment representing what is presently regarded as the best mode of carrying out the invention is illustrated in the accompanying drawings.

Figure 2:
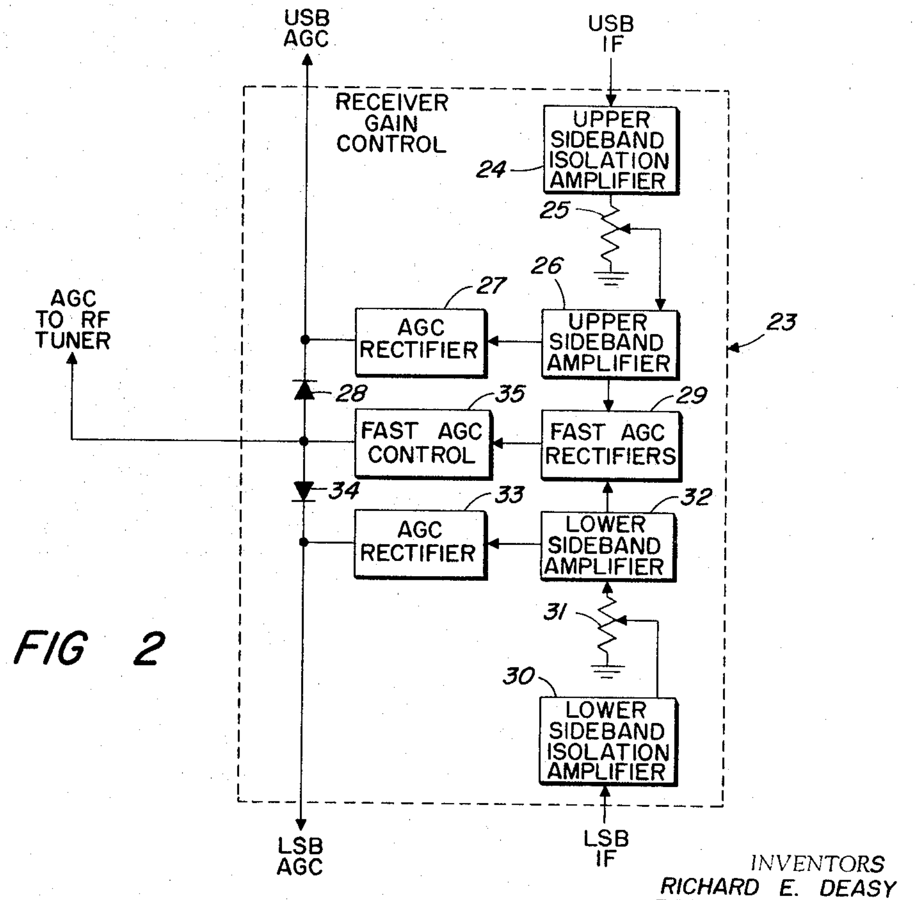
Figure 3:
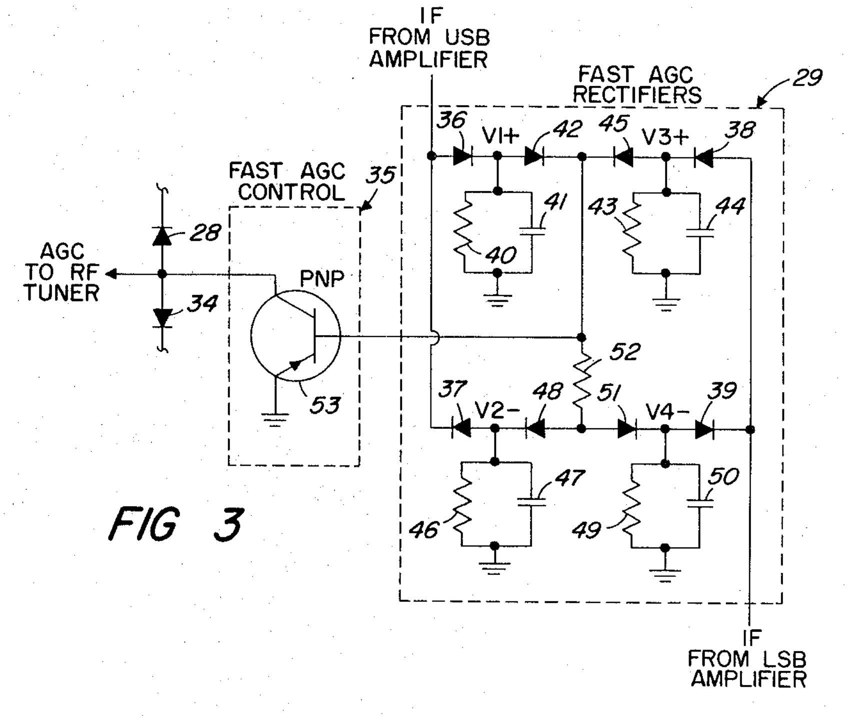
Figure 4:
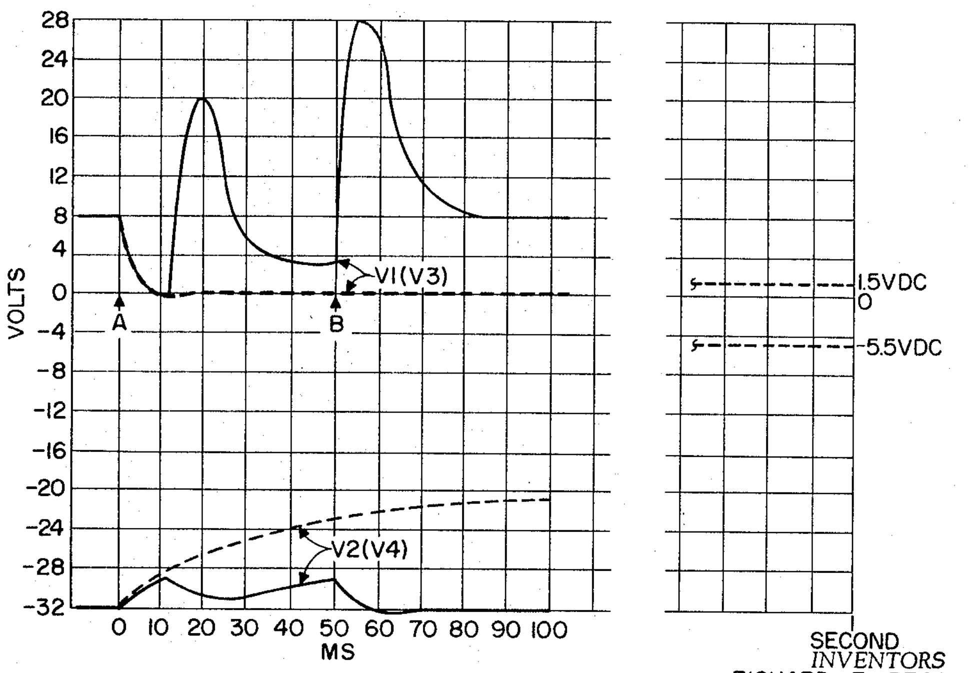

In the drawings:

FIGURE 1 represents a block diagram of an upper and lower sideband receiver equipped with AGC circuitry supplying bias voltages to both upper and lower sideband IF amplifier stages and to the RF tuner;

FIGURE 2, a block diagram of the receiver gain control system including conventional AGC bias development portions and a fast AGC loop included with the gain control circuitry;

FIGURE 3, a detailed schematic of the fast AGC circuitry included in the AGC system of the receiver; and FIGURE 4, a graph of voltage vs. time of voltages developed within the rectifier section of the fast AGC circuitry, with variations in received signal strength, for determining the control voltage applied at the base of the AGC shorting transistor.

Referring to the drawings:

The upper and lower sideband receiver 10 of FIGURE 1 receives sideband signals from antenna 11. These input sideband RF signals are fed to RF tuner 12 where they are combined with a carrier reinsertion frequency fed to the turner from reference carrier frequency oscillator 13 through multiplier stabilizer circuit 14. The upper and lower sideband outputs from RF tuner 12 are applied to, respectively, upper sideband IF amplifier 15 and lower sideband IF amplifier 16. The output signal of the upper sideband amplifier is fed to a mixer 17 from which audio output is fed through audio amplifier 18 to utilizing equipment 19. In like manner, the output of lower sideband IF amplifier 16 is fed to mixer 20 from which the audio output developed is applied through audio amplifier 21 to utilizing equipment 22. The mixer IF carrier frequency is applied to mixers 17 and 20 from multiplier stabilizer circuit 14. The output lines of upper and lower sideband IF amplifiers 15 and 16 are connected as inputs to receive gain control 23 from which gain control voltage bias circuit connections are provided back to IF staging of amplifiers 15 and 16 and also to RF tuner 12.

Referring also to FIGURE 2, the output connection from upper sideband IF amplifier 15 is, in receiver gain control 23, fed to upper sideband isolation amplifier 24. The output of amplifier 24 is subject to bias voltage level gain control 25 for adjusting the proportion of AGC bias voltage to receiver upper sideband signal level. The gain adjusted output of amplifier 24 is applied to an upper sideband signal amplifier 26 having at least two output connections. One output is applied to a conventional AGC rectifier 27, the output of which is applied part of the time as AGC bias voltage to IF amplifier staging in upper sideband amplifier 15, and also for some of the time, that diode 28 is forwardly biased, as AGC bias voltage to RF amplifier staging in RF tuner 12. The other output of upper sideband signal amplifier 26 is applied to fast AGC rectifier section 29.

In like manner, the output connection from lower sideband IF amplifier 16 is, in the receiver gain control 23, fed to lower sideband isolation amplifier 30. The output of amplifier 30 is subject to bias voltage level gain control 31 for adjusting the proportion of AGC bias voltage to receiver lower sideband signal level. The gain adjusted output of amplifier 30 is applied to a lower sideband signal amplifier 32 having at least two output connections. One output is applied to a conventional AGC rectifier 33, the output of which is applied part of the time as AGC bias voltage to IF amplifier staging in lower sideband amplifier 16, and also for some of the time, that diode 34 is forwardly biased, as AGC bias voltage to RF amplifier staging in RF tuner 12. The other output of lower sideband signal amplifier 32 is applied to fast AGC rectifier section 29.

The output of fast AGC rectifier section 29 is applied to a fast AGC control 35 connected to the RF tuner AGC line. It should be noted that diodes 28 and 34 have their anodes connected to the RF tuner AGC line while their cathodes are connected, respectively, to the AGC bias voltage lines out of the upper and lower sideband AGC rectifiers 27 and 33. During normal receiver operation, except for periods of sudden drop in data signal level received, the AGC bias voltages developed through AGC rectifiers 27 and 33 are applied to IF staging of the respective sidebands, and the greater AGC negative bias voltage developed forwardly biases the respective diode 28 or 34, and that greater AGC bias voltage is thereby applied for controlling the gain of the RF tuner. When this occurs the other diode 28 or 34 is reverse biased with the lesser negative AGC bias voltage developed continuing to be applied to the IF staging of the respective sideband.

Referring now to FIGURE 3, for fast AGC rectifiers section 29 and fast AGC control 35 detail, an output connection from upper sideband signal amplifier 26 to section 29 leads to fast AGC rectifier diodes 36 and 37, and in like manner an output connection from lower sideband signal amplifier 32 leads to fast AGC rectifier diodes 38 and 39. Diodes 36 and 38 have their anodes connected to the respective incoming leads while diodes 37 and 39 have their cathodes connected to the respective incoming leads. Each of these diodes has its other electrode connected through a resistor and capacitor, in parallel, to ground. In the case of diode 36, the cathode is connected through resistor 40 and capacitor 41, in parallel, to ground, and also to the anode of a gating diode 42. The cathode of diode 38 is connected through resistor 43 and capacitor 44, in parallel, to ground, and also to the anode of gating diode 45, the cathode of which is connected in common with the cathode of gating diode 42. The anode of diode 37 is connected through resistor 46 and capacitor 47, in parallel, to ground, and also to the cathode of gating diode 48. The anode of diode 39 is connected through resistor 49 and capacitor 50, in parallel, to ground, and also to the cathode of gating diode 51, the anode of which is connected in common with the anode of gating diode 48. It should be noted that the resistor 40 and capacitor 41 component values are materially less than the resistor 46 and capacitor 47 component values, and that the same relationship exists between the resistor 43 and capacitor 44 component values relative to the resistor 49 and capacitor 50 component values.

The common junction of diodes 48 and 51 is connected through resistor 52 to both the common junction of diodes 42 and 45 and the base of transistor 53 of fast AGC control 35. The emitter of transistor 53 is connected to ground while the collector is connected to the common junction between the anodes of diodes 28 and 34 and the AGC line to RF tuner 12.

Whenever transistor 53 is triggered to conduction by a negative voltage bias applied at the base the AGC bias line to RF tuner 12 is effectively shorted to ground. With such fast removal of negative AGC biasing voltage, the RF tuner is substantially immediately restored to maximum gain. Simultaneously, with negative AGC bias voltage in the sideband IF amplifier AGC lines, diodes 28 and 34 are forwardly biased to give a simultaneous sideband AGC biasing voltage decrease and an immediate increase in gain of both sideband IF amplifier stages.

The action of diode rectifiers in fast AGC rectifier section 29 is quite important in developing fast AGC control trigger voltage at the base of transistor 53 for swiftly decreasing AGC bias voltages on both the RF tuner and IF AGC lines. This quickly restores receiver gain, for example, within 15 milliseconds, when there is a sudden drop in received signal strength or a complete drop from a strong signal to no signal at all. Actually, with constant inputs, or normal slow signal amplitude changes, the D.C. control voltage developed in the fast AGC rectifier section 29, and applied to the base of transistor 53, is positive and the transistor is cut off. Whenever the transistor has been triggered to conduction by negative voltage applied at the base for quickly restoring a higher gain level in the receiver, immediately after the end of a strongly received signal, the resulting fast increase of receiver gain quickly returns the voltage applied at the base of transistor 53 to a positive bias, particularly if there is any received signal even though at a reduced level, and transistor 53 is cut off.

The IF signal input from upper sideband amplifier 26 is rectified by diode 36 to produce a positive voltage V1 across resistor 40 and capacitor 41. This input is also rectified by diode 37 to produce a negative voltage V2 across resistor 46 and capacitor 47. In like manner, the IF signal input from lower sideband amplifier 32 is rectified by diode 38 to produce a positive voltage V3 across resistor 43 and capacitor 44, and is also rectified by diode 39 to produce a negative voltage V4 across resistor 49 and capacitor 50. Whichever IF input to fast AGC rectifier section 29, that from upper sideband amplifier 26 or that from lower sideband amplifier 32, has the greater magnitude controls the D.C. bias voltage applied at the base of transistor 53. For example, if the upper sideband signal is larger, V1 and V2 are gated through diodes 42 and 48, respectively, and diodes 45 and 51 are reverse biased, thus isolating the V3 and V4 voltages produced by the lower sideband input signal.

Obviously, the reverse magnitudes of inputs would result in voltage V3 being gated through diode 45 and V4 being gated through diode 51, and diodes 42 and 48 being reverse biased with D.C. bias voltages V1 and V2 thereby isolated. Considering the IF signal from the upper sideband amplifier to be stronger and realizing that the following descriptive material with respect thereto would be equally applicable to the action resulting with a larger lower sideband input signal, V1 gated through diode 42 is passed to the base of transistor 53. It should be noted that V2 gated through diode 48 acts through resistor 52 as a floating reference to vary the voltage V1 and enables the voltage V1 to drop to a relatively negative value when there is a sudden drop in the received signal, particularly with the greater voltage retention characteristics of the V2 voltage relative to the V1 voltage with the component value differences in the respective RC circuits associated therewith.

Please refer to FIGURE 4 for typical V1 and V2 voltage relationships which could, for that matter, also be the typical V3 or V4 voltage relationships. With a sudden received signal decrease, resulting in substantially the same decrease in upper sideband and lower sideband signal strength voltage V1, with the component values used, decreased approximately 40 times faster than voltage V2 to a level resulting in a negative voltage being quickly applied to the base of transistor 53, and biasing the transistor to conduction. This shorts the collector of transistor 53 and the RF tuner AGC line to ground, and AGC bias voltage goes from a negative value towards zero increasing the receiver gain.

If the received signal has, at time A, gone completely to zero, the voltage levels V1 and V2, resulting in a voltage bias substantially V1 (or V3 if V3 and V4 are controlling) applied at the base of the transistor, will substantially follow the broken lines of FIGURE 4. The voltage V1 very quickly drops and goes below zero to a negative value for a short period of time during which transistor 53 is turned on. Voltage V1 then returns to substantially zero with conduction of transistor 53 occurring only during the period of time that V1 and the voltage bias at the base of the transistor is negative and stopping as it comes back to zero. With the condition of no received signal input continuing to persist, voltage V1 gradually becomes more positive and stabilizes at a relatively low positive voltage potential level (+1.5 volts, for example, at one second). Simultaneously, the voltage V2 developed starts from a strongly negative voltage bias level (−32 volts, for example), and with the continuing condition of no received signal input, V2 gradually decreases in magnitude to ultimately stabilize at a relatively small negative voltage bias level (−5.5 volts, for example, at one second).

However, with a sudden drop to a weaker received signal, V1 will very quickly, after dropping below zero as indicated by the solid line, and transistor 53 shorting of AGC bias voltage toward ground, rise to a peak positive voltage, with resulting receiver gain increase, and then drop back down to a lower positive voltage (approximately 3 volts). If the received signal remained at the same level, V1 would increase from 3 volts to stabilize at approximately 6 volts. However, with a sudden increase in signal strength, at time B, back to the signal level prior to time A, the conventional AGC action for signal increase results in an immediate sharp peaking increase of V1 to a greatly increased positive potential level. Shortly subsequent thereto, AGC action of the receiver brings receiver gain down and V1 back down to substantially the original voltage level.

Simultaneously, during the time from A to time B, voltage V2 decreases in magnitude more slowly than for the no signal input condition until the transistor 53 shorts AGC bias voltage toward ground, and with the resulting sharply increased receiver gain, V2 starts increasing in magnitude and then shortly thereafter with receiver gain falling off and stabilizing, V2 resumes a decrease in magnitude. Then, with a sudden increase in the received input level at time B, from, for example, back from a reduced signal level of 100$\mu$ volts to the 100,000$\mu$ volt level before time A, V2 increases in magnitude to substantially the magnitude of V2 that existed during reception of a moderately strong signal immediately prior to time A.

In this fast AGC control system, voltages V1 and V2, or for that matter, V3 and V4, whichever is controlling as a result of a stronger signal out of upper sideband amplifier 26 or lower sideband amplifier 32, are different than they would be if the other were not developed in the system. It is particularly important with respect to V1 that under most operating conditions, that V1 be positive enough to prevent noise variation from being enough to result in biasing of transistor 53 to conduction. This normally high positive voltage level of V1 is permitted because of the cooperative reference negative voltage V2 developed in the system. V2, in this working relation, is particularly important in providing a varying negative voltage reference operating to, in its cross effect, on the voltage V1, to "quickly" bring V1 down to, and below, zero bias voltage level, with a sudden drop in received signal level, for obtaining the desired fast AGC action and swift recovery of gain through the receiver. It should again be noted that the fast AGC system does not, under normal conditions, control sudden increases in receiver level. Transistor 53 is normally cut off, and increases in the received signal level generally cause a more positive voltage V1 and higher positive control voltage at the base of transistor 53, thereby maintaining the normal cut off state of transistor 53.

Components used in a working fast AGC voltage decay circuit for a data signal handling sideband receiver providing results such as hereinbefore described and as illustrated by the graph of V1 and V2 voltages in FIGURE 4, include the following:

| | | |
|---|---|---|
| Diodes **28**, **34**, **42**, **45**, **48** and **51** | | JAN IN645M |
| Diodes **36**, **37**, **38** and **39** | | USN IN3070 |
| Resistors **40** and **43** | Ohms | 100K |
| Capacitors **41** and **44** | $\mu f$ | 0.1 |
| Resistors **46** and **49** | Ohms | 383K |
| Capacitors **47** and **50** | $\mu f$ | 1 |
| Resistor **52** | Ohms | 196K |
| PNP transistor **53** | | 2N328A |

Whereas this invention is here illustrated and described with respect to a specific embodiment thereof, it should be realized that various changes may be made without departing from the essential contribution to the art made by the teachings hereof.

We claim:

1. In a radio frequency sideband receiver having an RF tuner, upper sideband IF amplifier staging, and lower sideband IF amplifier staging, a mixer for each of the sidebands, and signal output utilization connecting means for each sideband, a frequency source connected for application of reference frequency to the RF tuner and for carrier frequency input to mixers of the upper and lower sidebands, and an automatic gain control (AGC) system; said AGC system including an automatic gain control loop with conventional AGC bias voltage rectifying means and having AGC bias voltage line means connected to amplifier staging of the receiver; and with said AGC system including AGC voltage decay circuitry for quickly increasing gain sensitivity in the receiver immediately after the end of a strongly received RF signal to quickly insure subsequent reception of any signal at a weaker level that may be transmitted on the received frequency; with said AGC voltage decay circuitry including a multielement solid state device having a first element connected to said AGC bias voltage line means, a second element connected to a voltage reference source, and a third element connected to a varying voltage bias rectifying source connected to develop such varying voltage with variation of a sideband IF amplifier output signal level for varying the voltage bias applied to said third element and controlled biasing of said multielement solid state device to conduction for removing bias voltage from said AGC bias voltage line means; and wherein said varying voltage bias rectifying source is connected to the output of the IF amplifier staging of one of the sidebands and includes two diode rectifiers, one connected for rectifying a D.C. bias voltage of one potential and the other connected for rectifying a bias voltage of the opposite potential, each of said diode rectifiers having, at the rectified voltage output side, respectively, an RC network connection to a voltage potential reference source, with the two RC networks having different voltage retention characteristics, and each of said diode rectifiers having a bias voltage output connection to said third element of said multielement solid state device, and with impedance means between at least one of said diode rectifiers and said third element.

2. The radio frequency sideband receiver of claim 1, wherein said AGC system includes an upper sideband automatic gain control loop with conventional AGC bias voltage rectifying means, and a lower sideband automatic gain control loop with conventional AGC bias voltage rectifying means, with each having AGC bias voltage line means connected to amplifier staging of the respective IF staging of the respective sideband; an AGC line to RF amplifier staging in the RF tuner connected to the common junction between the same element of two diodes having their other elements connected to the respective upper and lower sideband AGC bias voltage line means, and with said AGC line to RF amplifier staging in the RF tuner connected to said first element of the multielement solid state device of said AGC voltage decay circuitry.

3. In a radio frequency sideband receiver having an RF tuner, an upper sideband section having IF amplifier staging, and an upper sideband automatic gain control (AGC) loop with an AGC bias voltage line connected to IF amplifier staging of the upper sideband section, a lower sideband section having IF amplifier staging, and a lower sideband AGC loop with an AGC bias voltage line connected to IF amplifier staging of the lower sideband section of the receiver, an RF tuner AGC line connected to the AGC bias voltage line of at least one of said sidebands and to a fast AGC voltage decay circuit connected to the RF tuner AGC line: said fast AGC voltage decay circuit including, a first voltage rectifying section connected for rectifying voltage from the IF output signal of the upper sideband section; a second voltage rectifying section connected for rectifying voltage from the IF output signal of the lower sideband section; said voltage rectifying sections being connected through diode gates to the first element, a controlling element of a multielement solid state device, having a second element connected to said RF tuner AGC line, and a third element connected to a voltage potential reference source; and with the first element of said multielement solid state device also connected through impedance means to a second voltage source; and wherein each of said first and second voltage rectifying sections have two diode rectifiers, one connected anode and the other connected cathode to receive the IF input signal; said diode gates including a diode gate with an anode to cathode connection with each respective rectifying diode of each rectifying section, and with the other electrode of each gating diode connected to the same electrode of the similar gating diode of the other rectifier section; the junction between each rectifying diode and its associated gating diode being connected through an RC network to a voltage potential reference source; the common junctions of the similarly connected gating diodes of the two rectifier sections being connected to the first element of said multielement solid state device; and with one of said common junctions between gating diodes being part of the connection of said second voltage source.

4. In a radio frequency sideband receiver having an RF tuner, an upper sideband section and a lower sideband section and with each of the sideband sections having an automatic gain control (AGC) loop: an RF tuner AGC line connected through respective individual gating diodes to each of the sideband AGC loops and with the gating diodes having a common connection with the RF tuner AGC line between like electrodes of the gating diodes; said RF tuner AGC line also being connected to a fast AGC voltage decay circuit comprising: a multielement solid state device having a first control element connected to a variable voltage bias control source, a second element connected to the RF tuner AGC line, and a third element connected to ground in order to establish a current flow path to ground from said RF tuner AGC line, and with forward biasing of said gating diodes to establish a current flow path to ground from said sideband AGC loops.

5. The radio frequency sideband receiver of claim 4, wherein the variable voltage bias control source of said fast AGC voltage decay circuit includes an upper sideband voltage rectifying and gating section, and a lower sideband voltage rectifying and gating section; with, in each rectifying section, two diode rectifiers, one connected anode and the other connected cathode for receiving an IF input signal from the respective sideband section; each of the rectifying diodes being connected at its output voltage rectifying electrode side through a parallel capacitor and resistor circuit to ground, and with component value differences existing between the two capacitor and resistor circuits within each said voltage rectifying and gating section; each of said diode rectifiers being series connected through a gating diode of the same orientation as the associated diode rectifier to a common connection of each gating diode with the same electrode of the corresponding gating diode of the other voltage rectifying and gating diode section; with the gating diode common junctions between the voltage rectifying sections being connected together and to said first control element of the multielement solid state device; and including imepdance means between the common connection between two of the gating diodes and said first control element.

6. The radio frequency receiver of claim 5, wherein said multielement solid state device is a transistor and the diodes are solid state diodes.

7. The radio frequency receiver of claim 6, wherein said transistor is a PNP transistor with said first control element being the base, the second element connected to the RF tuner AGC line being the collector, and the third element connected to ground being the emitter.

8. The radio frequency receiver of claim 5, wherein the impedance means connected between the common junction between two of the gating diodes and said first control element is connected to the connection between the gating diodes connected anode to anode in the variable voltage control source; and with the other pair of gating diodes in the variable voltage control source connected cathode to cathode.

References Cited by the Examiner

UNITED STATES PATENTS

| | | | |
|---|---|---|---|
| 2,836,712 | 5/1958 | Crosby | 325—329 |
| 2,957,074 | 10/1960 | Trevor | 325—319 |
| 3,154,740 | 10/1964 | Eness | 325—319 |
| 3,165,699 | 1/1965 | Henmueller | 325—411 |
| 3,230,458 | 1/1966 | Stangeland | 325—411 |

KATHLEEN H. CLAFFY, *Primary Examiner.*

R. P. TAYLOR, *Assistant Examiner.*